United States Patent

Bettin et al.

[11] Patent Number: 6,068,064
[45] Date of Patent: May 30, 2000

[54] AGRICULTURAL IMPLEMENT WITH GROUND ENGAGING TOOL AND FLUID CIRCUIT TO CONTROL SAME

[75] Inventors: Leonard A. Bettin, LaGrange Park; Daniel J. Boos, Aurora; Ronald M. Weber, Ingleside, all of Ill.

[73] Assignee: Case Corporation, Racine, Wis.

[21] Appl. No.: 09/081,992

[22] Filed: May 20, 1998

[51] Int. Cl.$^7$ .................................................. A01B 63/22
[52] U.S. Cl. .............................. 172/413; 91/451; 91/452
[58] Field of Search .................... 91/451, 452; 172/4, 172/260.5, 310, 311, 314, 315, 318, 317, 407, 411, 413, 452, 458, 462, 468, 487

[56] References Cited

U.S. PATENT DOCUMENTS

| | | |
|---|---|---|
| 3,233,682 | 2/1966 | Thompson . |
| 3,494,427 | 2/1970 | Greig et al. . |
| 3,749,035 | 7/1973 | Cayton et al. . |
| 3,926,210 | 12/1975 | Rasmussen ............................ 91/431 X |
| 3,974,742 | 8/1976 | Johnson ................................ 91/452 X |
| 4,044,697 | 8/1977 | Swanson . |
| 4,138,929 | 2/1979 | Peterson ............................... 91/451 X |
| 4,165,675 | 8/1979 | Cryder et al. ......................... 91/452 X |
| 4,203,275 | 5/1980 | Vermeer . |
| 4,206,688 | 6/1980 | Haak et al. .............................. 91/452 |
| 4,214,446 | 7/1980 | Bettin ....................................... 60/420 |
| 4,215,720 | 8/1980 | Becker .................................. 91/451 X |
| 4,337,959 | 7/1982 | Bettin et al. ........................ 172/413 X |
| 4,496,004 | 1/1985 | Frase et al. ............................. 172/311 |
| 4,648,466 | 3/1987 | Baker et al. . |
| 4,747,257 | 5/1988 | Hutchison . |
| 4,809,786 | 3/1989 | Hoehn et al. . |
| 4,903,781 | 2/1990 | Smit . |
| 4,906,262 | 3/1990 | Nelson et al. . |
| 4,915,014 | 4/1990 | Gilmore et al. . |
| 4,920,732 | 5/1990 | Lee et al. . |
| 5,065,681 | 11/1991 | Hadley . |
| 5,409,069 | 4/1995 | Hake . |
| 5,562,165 | 10/1996 | Janelle et al. . |
| 5,615,553 | 4/1997 | Lourigan . |
| 5,687,798 | 11/1997 | Henry et al. . |

Primary Examiner—Victor Batson
Attorney, Agent, or Firm—Mayer, Brown & Platt

[57] ABSTRACT

Agricultural implement to be conveyed by a self propelled vehicle includes a structural frame and a substructure moveable between a raised position and a lowered position. The substructure has at least one ground engaging tool supported thereon so as to engage the ground when the substructure is moved to the lowered position. A fluid circuit is provided to control engagement of the tool with the ground. The fluid circuit includes a first check valve having a first side connectable to a source of pressurized fluid flow and a second side connected to a fluid cylinder. The fluid cylinder is operated between a retracted position and an extended position to move the substructure between the raised position and the lowered position, respectively. A second check valve is provided having a first side connected to drain and a second side connected to the fluid cylinder. A sensor assembly opens the second check valve when pressurized fluid flow is received by the first side of the first check valve. A pressure relief valve is connected between the first check valve and the fluid cylinder, the pressure relief valve having a relief port in fluid communication with the first side of the second check valve to direct pressurized fluid thereto when the pressurized fluid between the second side of the first check valve and the fluid cylinder exceeds a preselected pressure.

19 Claims, 6 Drawing Sheets

AGRICULTURAL IMPLEMENT WITH GROUND ENGAGING TOOL AND FLUID CIRCUIT TO CONTROL SAME

FIELD OF THE INVENTION

The present invention relates to an agricultural implement having at least one ground engaging tool and a fluid circuit to control operation of the ground engaging tool. Particularly, the present invention is directed to a fluid control circuit to control engagement of the ground engaging tool with the ground, either for continuous down pressure control or for selected high pressure relief of down pressure control.

BACKGROUND OF THE INVENTION

Agricultural implements having one or more ground engaging tools, such as opener disks and seed drills, are well known. A conventional agricultural implement generally includes a frame to be conveyed as a trailer behind a tractor or similar self propelled vehicle. A rockshaft, a tool bar or a similarly moveable member is mounted to the frame so as to support one or more such ground engaging tools. Movement of the member, and thus the tools, typically is accomplished using at least one hydraulic cylinder operatively extending between the frame and the moveable member. As such, the moveable member can be lowered so as to engage the tools with the ground.

It is desirable to control the degree or depth in which the ground engaging tool engages the ground. Improper tool depth will adversely impact tillage and seeding results, including uneven seed germination, inconsistent crop maturity and potentially lower crop yields. However, tool depth will vary not only due to irregularities and changes in the surface and type of soil across which the agricultural implement is conveyed, but also due to variations in the overall load imparted by the agricultural implement and materials loaded thereon during operation. As such, it is preferable to enable constant adjustment of the tool depth for optimal results.

A variety of techniques have been developed to address tool depth control. For example, it is common to mount each ground engaging tool for independent movement relative to the other ground engaging tools. A biasing device, such as a mechanical or hydraulic spring is provided to apply a continuous downwardly-directed force on each ground engaging tool. Although such independently-biased mounting configurations satisfactorily accommodate minor fluctuations for each ground engaging tool, it often is necessary to apply and adjust an overall downwardly-directed force acting against the entire structure upon which the ground engaging tools are mounted. In this manner, greater control over a more diverse range of operating conditions can be accommodated.

One known technique of applying an overall downwardly-directed force is to load separate weights on the agricultural implement. This technique, however, is labor intensive and often provides limited results.

It also is known to use one or more hydraulic cylinders or similar devices for tool depth control. This may be accomplished either by implementing the same hydraulic cylinders that are used to raise and lower the tools between their storage and operating positions, respectively, or by using separate hydraulic cylinders for such depth control. A variety of hydraulic circuits have been developed to operate these hydraulic cylinders so as to control the downward force exerted to the tools, and thus control the depth in which the tools engage the ground. These hydraulic circuits generally are connected in fluid communication via a tractor auxiliary control valve to a pump or similar hydraulic source provided on the tractor.

One known hydraulic circuit used for tool depth control includes a check valve located along a hydraulic supply line extending between the hydraulic pump and the head side of the hydraulic cylinder. Generally, pressurized hydraulic flow from the pump is directed downstream across the check valve to the head side of the hydraulic cylinder. The hydraulic cylinder is thereby extended so as to urge the tool into engagement with the ground as a function of the pressure within the head side of the hydraulic cylinder. Once the desired pressure of the hydraulic cylinder is reached, pressurized flow from the pump is secured, typically by using the tractor auxiliary control valve, and static pressure is maintained downstream of the check valve.

To ensure that the hydraulic cylinder is not over pressurized, such as when the tool transverses an undulation in the ground and is thereby forced upward, a fixed pressure relief valve is interconnected between the check valve and the head side of the hydraulic cylinder. The pressure relief valve includes a return port which returns pressurized fluid to the supply side of the check valve. In this manner, and with the pump secured, and with the tractor auxiliary control valve in its float position, hydraulic fluid between the check valve and the head side of the hydraulic cylinder is returned to the tractor through the supply line when the fixed pressure of the pressure relief valve is exceeded. The head side of the hydraulic cylinder can be repressurized by operating the (tractor valve) pump to again direct pump pressurized hydraulic fluid across the check valve.

Independently, another check valve is separately connected to the rod side of the hydraulic cylinder. Pressurized hydraulic fluid is supplied across this separate check valve to the rod side of the hydraulic cylinder to retract the hydraulic cylinder. The hydraulic cylinder is then held in its retracted position due to the pressurization that is maintained within the rod side of the hydraulic cylinder due to the separate check valve. Pilot lines generally are interconnected between the two separate check valves such that the check valve connected to the rod side of the hydraulic cylinder is opened when pressurized hydraulic flow is directed to the head side of the hydraulic cylinder, and the check valve connected to the head side of the hydraulic cylinder is opened when pressurized hydraulic flow is directed to the rod side of the hydraulic cylinder.

Although this known hydraulic circuit provides satisfactory results, it is not capable of continuous down pressure operation such that the downward pressure acting against the ground engaging tool can be maintained continuously. Furthermore, because static pressure is used to urge the tools into engagement with the ground, this hydraulic circuit lacks versatility and certain adjustment capabilities.

As an alternative, it is well known to use a pressure reducing valve in communication between a hydraulic pump and the head side of a hydraulic cylinder. The pressure reducing valve is provided to operate and maintain the hydraulic cylinder at a predetermined pressure. Although the pressure reducing valve is intended to allow for continuous down pressure operation, certain disadvantages are associated with this fluid circuit. For example, it has been found that the tractor auxiliary control valve will disengage from its selected operating position when excessive pressure in the hydraulic circuit is experienced or when the pressure reducing valve closes momentarily during system operation.

It therefore is necessary to monitor and manually reset the operating position of the tractor auxiliary control valve during field use, or to manipulate or otherwise disable the tractor auxiliary control valve so as to prevent disengagement of the selected operating position.

In view of the above, there remains a need for a hydraulic circuit that allows continuous down pressure operation to continuously maintain a down pressure force on a ground engaging tool for enhanced tool depth control. Furthermore, it is desirable to provide a hydraulic circuit that allows either high pressure relief operation or continuous down pressure operation of the down pressure tool.

SUMMARY OF THE INVENTION

The purpose and advantages of the invention will be set forth in and apparent from the description and drawings that follow below, as well as will be learned by practice of the invention. Additional advantages of the invention will be realized and attained by the elements of the apparatus particularly pointed out in the appended claims.

To achieve these and other advantages and in accordance with the purpose of the invention, as embodied and broadly described herein, a fluid circuit is provided to control an agricultural ground engaging tool. The fluid circuit includes a first check valve, at least one fluid cylinder, a second check valve and a pressure relief valve. Particularly, the fluid cylinder is operatively connected to control engagement of the ground engaging tool with the ground by operation of the fluid cylinder between a retracted position and an extended position.

The first check valve has a first side connectable to a source of pressurized fluid flow and a second side connected to the fluid cylinder. Furthermore, the first check valve is operatively connected to prevent reverse fluid flow from the second side of the first check valve to the first side of the first check valve. The second check valve likewise has a first side and a second side, wherein the second check valve is operatively connected to prevent fluid flow from the second side of the second check valve to the first side of the second check valve. The second side of the second check valve is in fluid communication with the fluid cylinder.

A sensor assembly is connected to the first side of the first check valve to open the second check valve and allow fluid flow from the second side of the second check valve to the first side of the second check valve when pressurized fluid flow is received by the first side of the first check valve. The sensor assembly also is connected to the first side of the second check valve to open the first check valve and allow reverse fluid flow from the second side of the first check valve to the first side of the first check valve when pressurized fluid flow is received by the first side of the second check valve.

A pressure relief valve is connected between the first check valve and the fluid cylinder. The pressure relief valve has a relief port in fluid communication with the first side of the second check valve to direct pressurized fluid thereto when the pressurized fluid between the second side of the first check valve and the fluid cylinder exceeds a preselected pressure. Preferably, the pressure relief valve is adjustable to vary the preselected pressure at which the pressurized fluid is to be directed from the pressure relief valve to the first side of the second check valve. In the preferred embodiment, the first check valve, the second check valve and the pressure relief valve are constructed as a single integral unit.

The first and second check valves are connectable to the source of pressurized fluid flow via a control valve. The control valve is selectively moveable between at least a first position to connect the first side of the first check valve in fluid communication with the source of the pressurized fluid flow and the first side of the second check valve in fluid communication with a drain to tank, and a second position to connect the first side of the second valve check valve in fluid communication with the source of the pressurized fluid flow and the first side of the first check valve in fluid communication with the drain. For high press relief operation the control valve should include a float position to connect the first side of the first check valve and the first side of the second check valve in fluid communication with the drain. By using a source of pressurized fluid flow that is adjustable between a low-flow condition and high-flow condition, (e.g., a closed-center system), the fluid circuit is capable of either high pressure relief operation or continuous down pressure operation.

The objects and advantages of the present invention are further achieved by an agricultural implement incorporating the fluid circuit. The agricultural implement is conveyed by a self propelled vehicle and includes a structural frame and a substructure connected to the frame for movement between a raised position and a lowered position. The substructure has at least one ground engaging tool supported thereon so as to engage the ground when the substructure is moved to the lowered position. Preferably, the substructure is a tool bar, a wing frame, or a combination thereof. The fluid cylinder of the fluid circuit is connected to move the substructure between its raised position and its lowered position.

It is to be understood that both the foregoing general description and the following detailed description are exemplary and are provided for purposes of explanation only, and are not restrictive of the invention, as claimed.

BRIEF DESCRIPTION OF THE DRAWINGS

The accompanying drawings, which are incorporated in and constitute a part of this specification, illustrate the preferred embodiment of the invention, and together with the description, serve to explain the principles of the invention.

DETAILED DESCRIPTION OF THE PREFERRED EMBODIMENT

Figure 1:
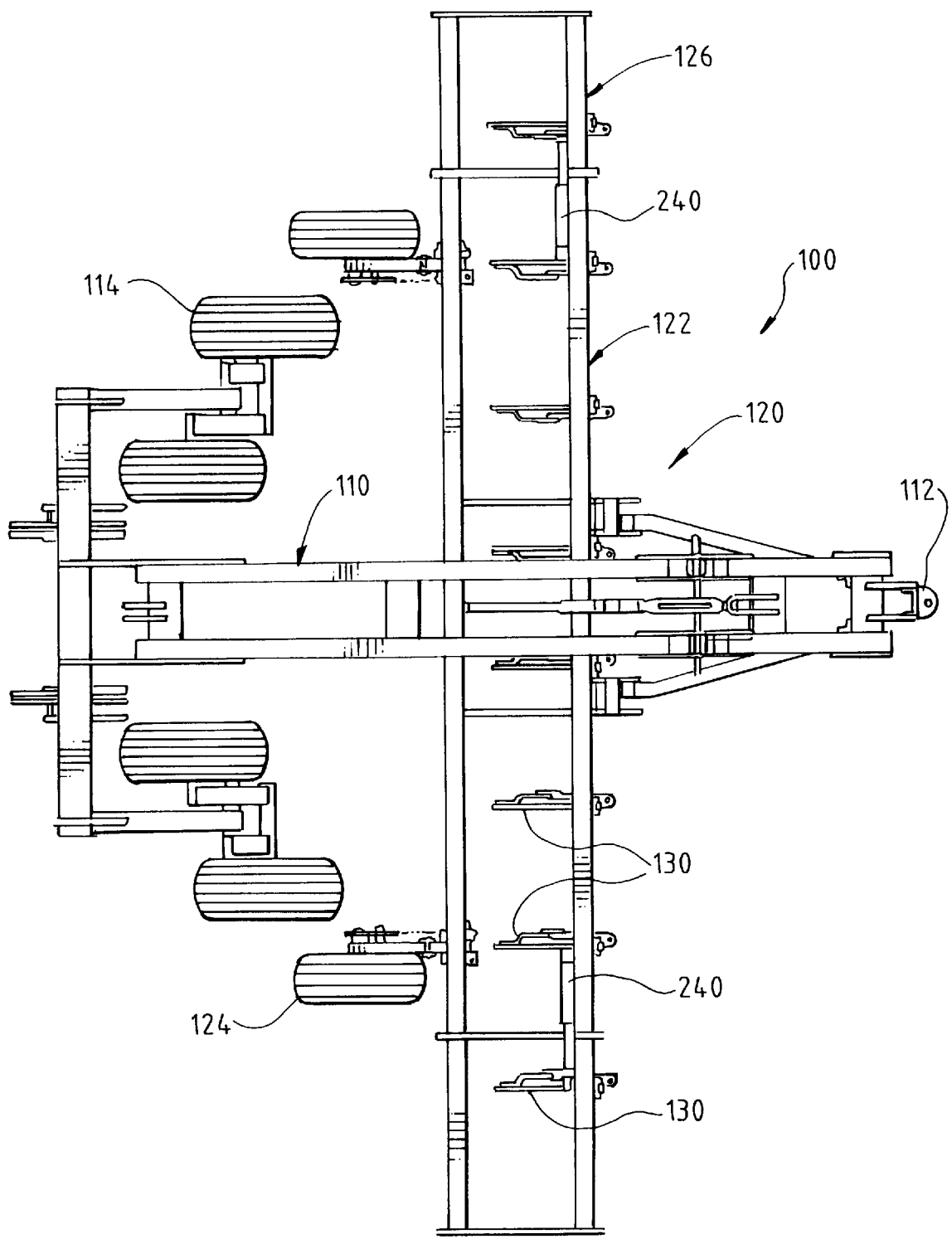
FIG. 1 is a top view of a representative embodiment of the agricultural implement of the present invention.

Reference will now be made in detail to the present preferred embodiment of the agricultural implement, as well as to the hydraulic circuit, of the present invention. Examples are illustrated in the accompanying drawings.

Wherever possible, the same reference characters will be used throughout the drawings to refer to the same or like parts. The operation of the present invention will be described in conjunction with the detailed description of the agricultural implement and hydraulic circuit for clarity.

In accordance with the present invention, an agricultural implement is provided to be conveyed by a self propelled vehicle such as a tractor, combine or similar vehicle capable of use in an agricultural field. The agricultural implement may be attached to the vehicle in any of a variety of different manners. For example, the agricultural implement may be securely mounted to either the front or rear of the vehicle chassis so as to be carried by the vehicle. Alternatively, and as embodied herein for purpose of illustration and not limitation, the agricultural implement may be attached to the vehicle by a one-point, two-point or three-point hitch assembly.

FIG. 1 shows one representative embodiment of agricultural implement 100 having a hitch assembly 112 to be attached to a tractor. agricultural implement 100, as shown, generally includes an elongate structural frame 110 supported at its front end by the tractor via the hitch assembly 112 and at its rear end by a series of tires 114. Extending transversely from the frame 110 is a substructure 120, upon which is mounted at least one ground engaging tool 130 such as, but not limited to, an opener disk or seed drill. The frame 110 and substructure 120 are constructed of sufficiently durable material, such as metal, using conventional techniques and components.

Figure 2:
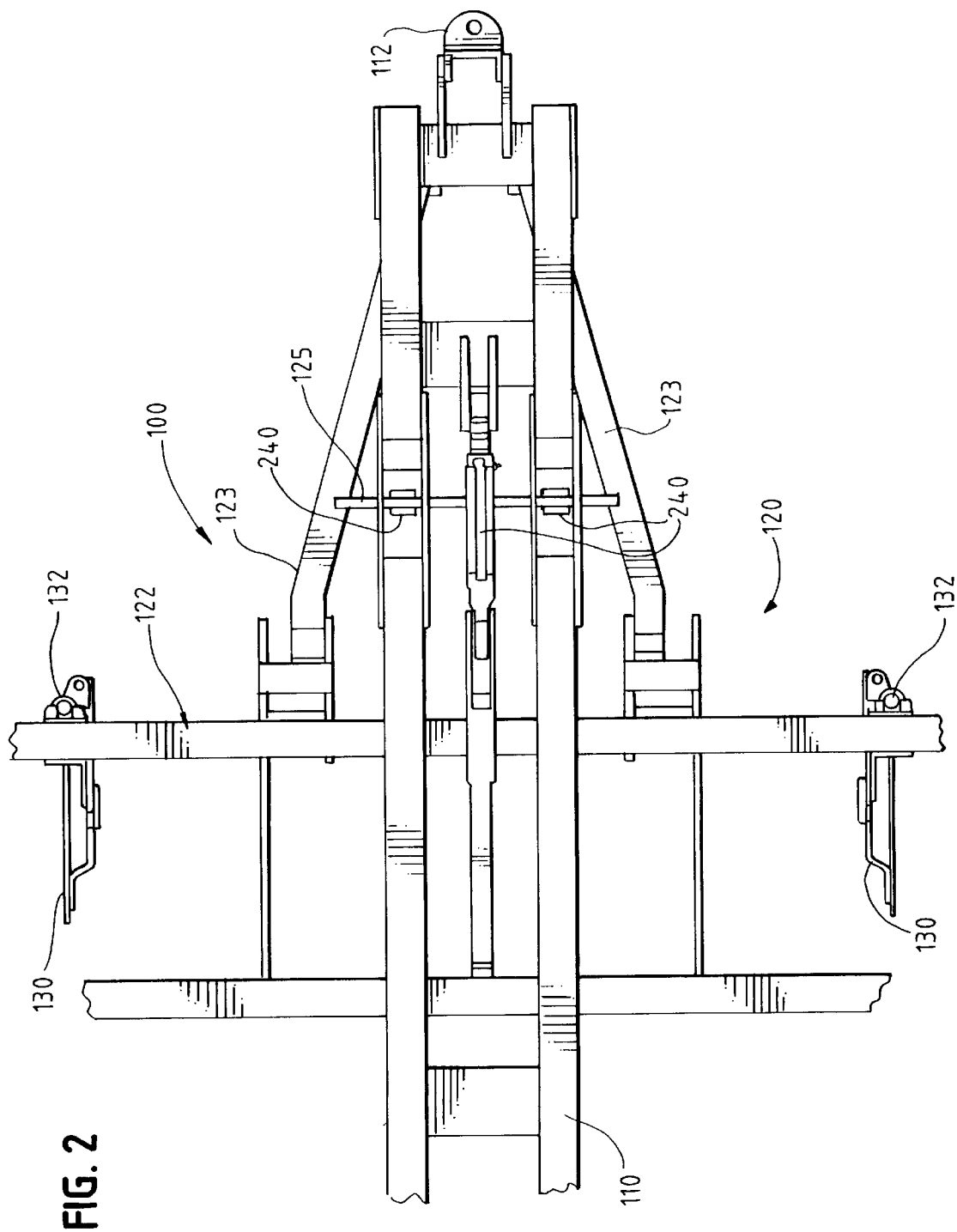
FIG. 2 is an enlarged fragmented top view of the connection between the frame and the tool bar of the agricultural implement shown in FIG. 1.
Figure 3:
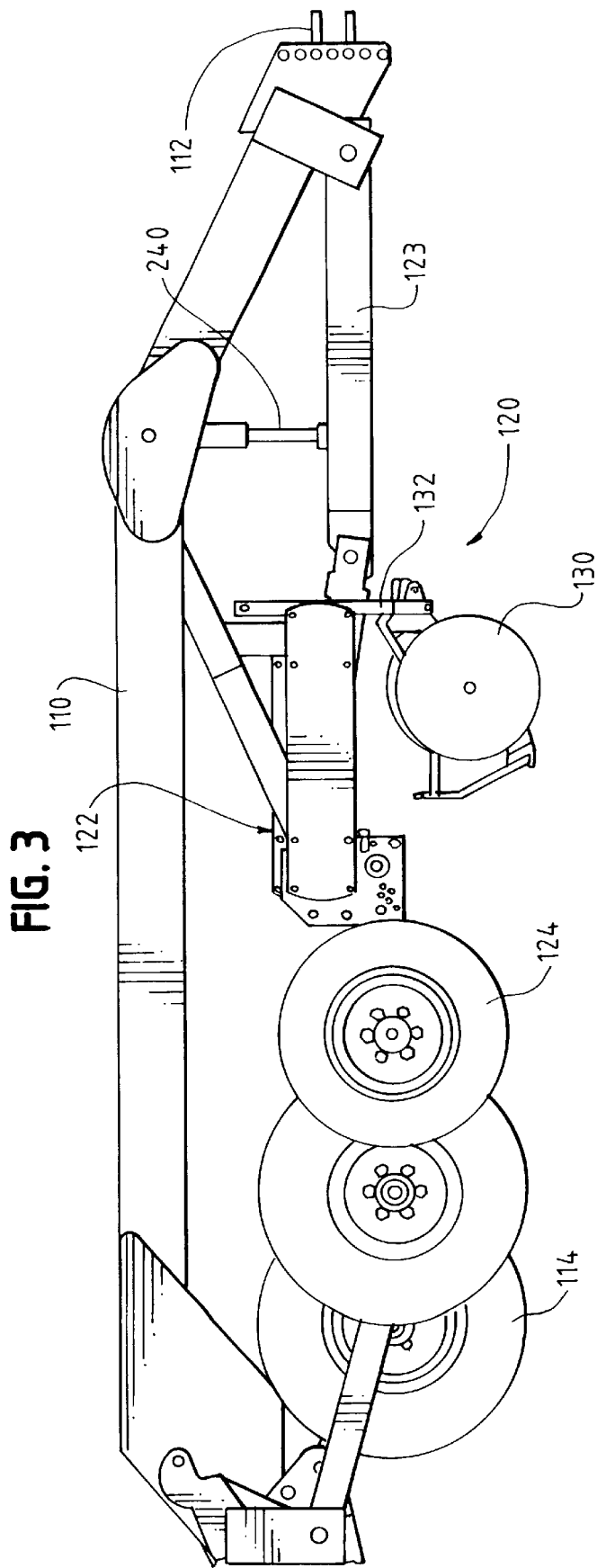
FIG. 3 is a side view of the connection between the frame and the tool bar shown in FIG. 2.
Figure 4:
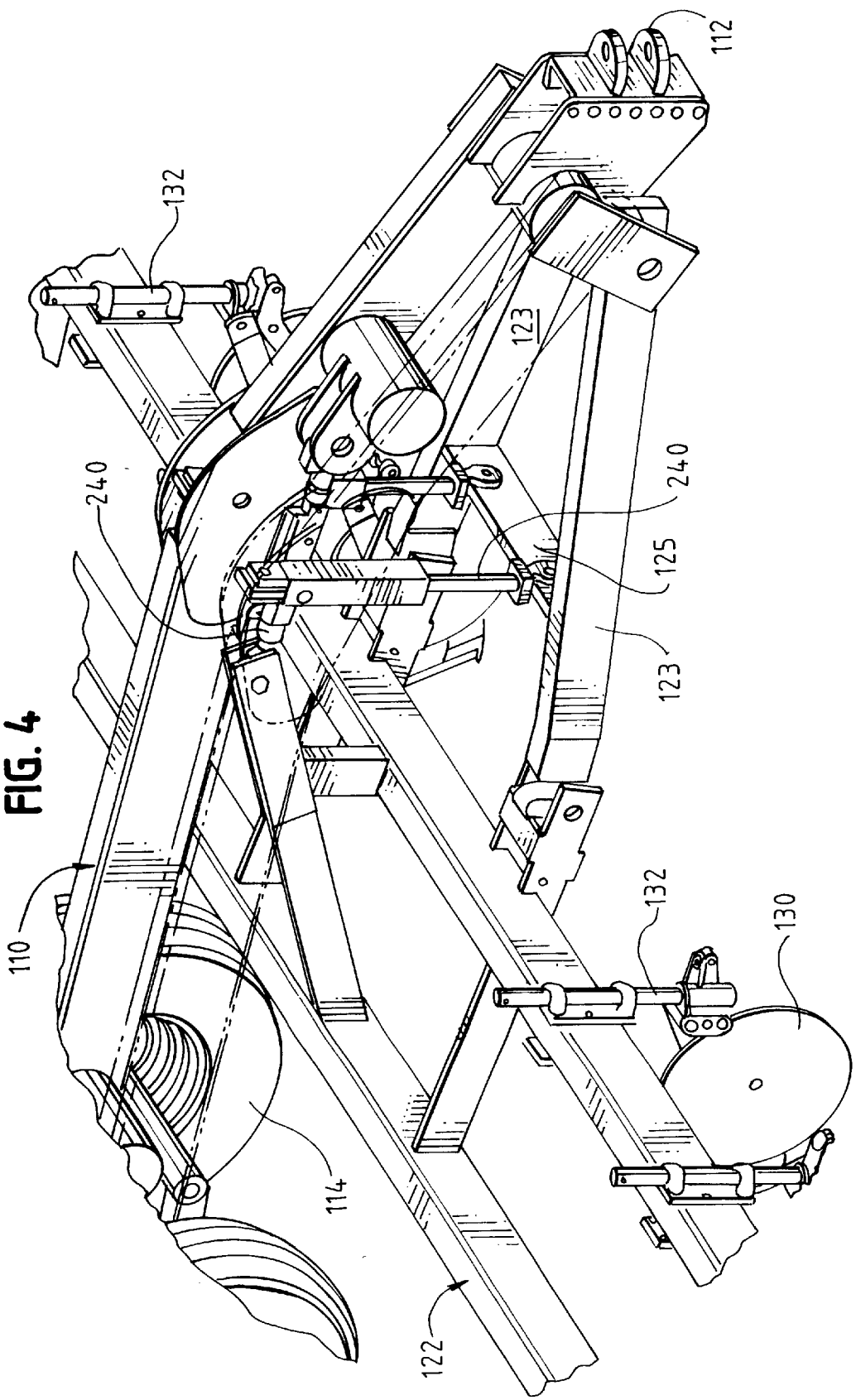
FIG. 4 is an enlarged perspective view of the connection between the frame and the tool bar shown in FIG. 2.

In accordance with the invention, the substructure 120 is connected to the frame 110 for movement between a raised position and a lowered position such that the tool 130 is operated into engagement with the ground by movement of the substructure 120. As embodied in FIGS. 1–4, one such example of a substructure 120 includes a transverse tool bar 122 connected to the frame 110 by at least one pivotal link member 123 for movement between its raised and lowered positions. In the preferred embodiment, however, at least three link members 123 pivotally extend between the frame 110 and the substructure 120 for more controlled and stable movement of the substructure 120. As best shown in FIGS. 2–4, two link members 123 extend approximately from the hitch assembly 112 to a lower portion of the substructure 120 and an additional link member 123 extends from a remote location on the frame 110 to an elevated portion of the substructure 120 so as to define a triangular or three point support. Each link member 123 is pivotally attached at one end to the frame 110 and at the other end to the substructure 120. Rocking or torsional movement of the tool bar 122 about the longitudinal axis of the agricultural implement 100 is thereby minimized. Once lowered, the transverse tool bar 122 is supported, at least partially, by gauge wheels 124.

Movement of the transverse tool bar 122 shown in FIGS. 1–4 is accomplished using at least fluid cylinder 240 extending between the frame 110 and the substructure 120. For example, FIG. 4 shows a pair of fluid cylinders 240 pivotally connected at one end to the frame 110 and at its other end to a crossbar 125 extending between the two lower link members 123. As used herein, the fluid cylinder 240 generally refers to a telescopic device having a head chamber 242 and a rod chamber 244, see FIGS. 5–6, such that pressurization of the head chamber 242 extends the length of the fluid cylinder 240 and pressurization of the rod chamber 244 retracts the length of the fluid cylinder 240. Although the fluid cylinder 240 may be operated pneumatically, the preferred embodiment is operated hydraulically using a pressurized fluid. It is further understood, however, that a fluid cylinder 240 likewise may refer to a similar fluid device such as linear actuator if desired. Operation of the fluid cylinder 240 is described further below.

As an alternative, and further in accordance with the invention, the substructure 120 may include a wing frame 126 connected for pivotal movement about a longitudinal axis between a raised position and a lowered position. One or more wing frames 126 may be provided along one side of the frame 110 or, more preferably, at least one wing frame 126 may be located on each side of the frame 110 for more balanced operation as shown in FIG. 1. Although the wing frames 126 of FIG. 1 are limited in length, it is understood that any feasible length may be used to accommodate a number of ground engaging tools 130.

Furthermore, each wing frame 126 may be pivotally connected to the frame 110 directly or, as shown in FIG. 1, pivotally connected to a transverse tool bar 122 that itself is moveable between raised and lowered positions. In this manner, a greater degree of control for operation of the ground engaging tools 130 mounted on the wing can be provided. As shown in FIG. 1, movement of the wing frame 126 between its raised and lowered positions is accomplished using a fluid cylinder 240 of similar construction to that described above.

FIG. 1 shows that a plurality of ground engaging tools 130 can be mounted on the moveable substructure 120 embodied herein. That is, a plurality of ground engaging tools 130 are mounted at least on the transverse tool bar 122; one ground engaging tool 130 is mounted on each wing frame 126 as shown. Although overall control and operation of the ground engaging tools 130 is performed by movement of the substructure 120 using a fluid circuit 200, as described further below, each ground engaging tool 130 preferably is mounted for independent movement so as to accommodate slight variations in the surface and soil type of the ground being traversed. Particularly, each ground engaging tool 130 is independently biased downwardly toward the ground by a mechanical, hydraulic or pneumatic spring 132 of conventional construction or the like.

Further in accordance with an additional aspect of the present invention, a fluid circuit 200 is provided to control engagement of the tools 130 with the ground. Particularly, and with regard to the agricultural implement 100 embodied herein, the fluid circuit 200 is provided to move the substructure 120 between its raised and lowered positions so as to control engagement of the corresponding tools 130 mounted thereon with the ground. It is recognized, however, that the fluid circuit 200 of the present invention likewise may be used to control engagement of each tool 130 directly if a moveable substructure 120 were not provided.

Figure 5:
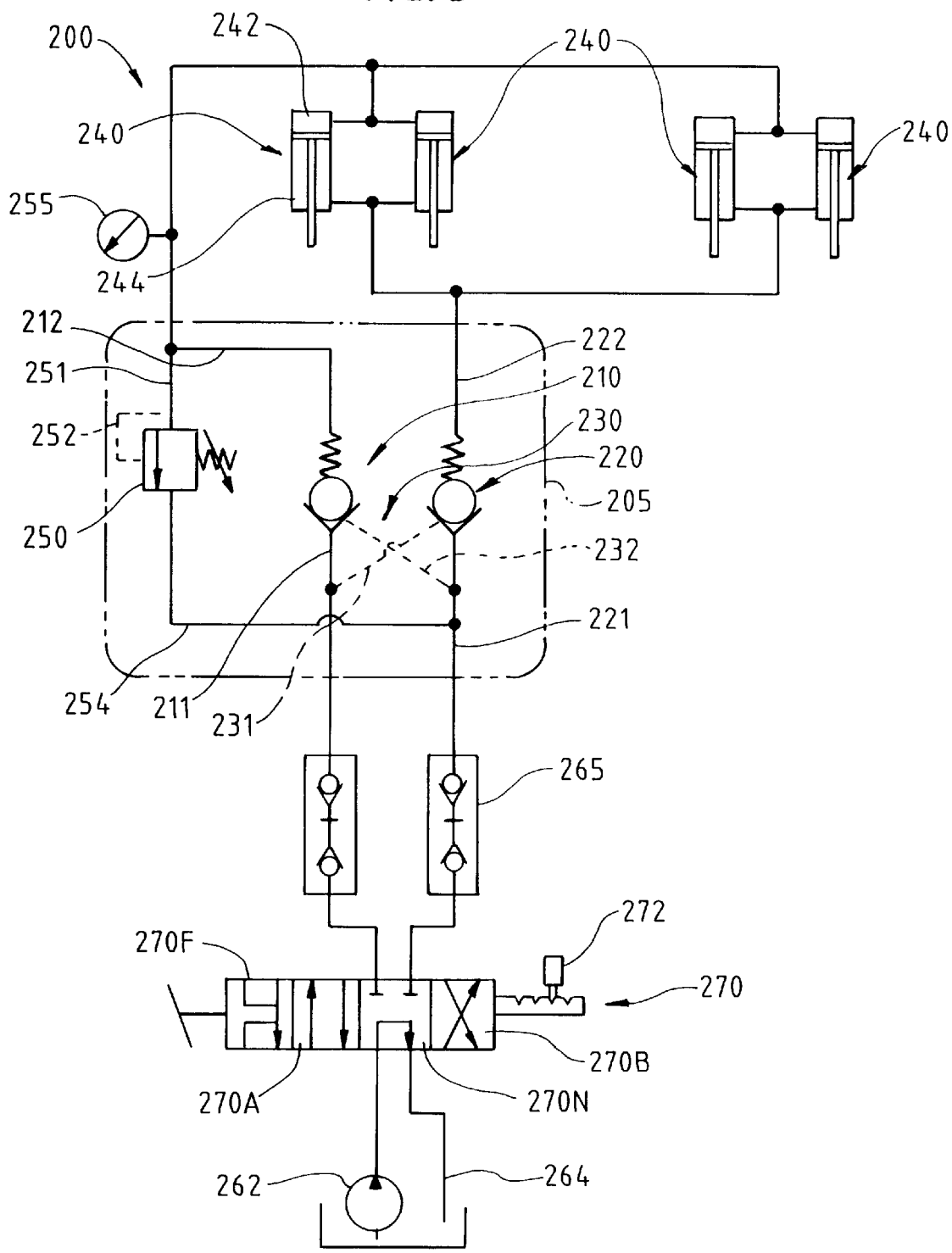
FIG. 5 is a schematic view of a representative embodiment of the hydraulic circuit of the agricultural implement shown in FIG. 1, as used in combination with a control valve having an open-center operating position.
Figure 6:
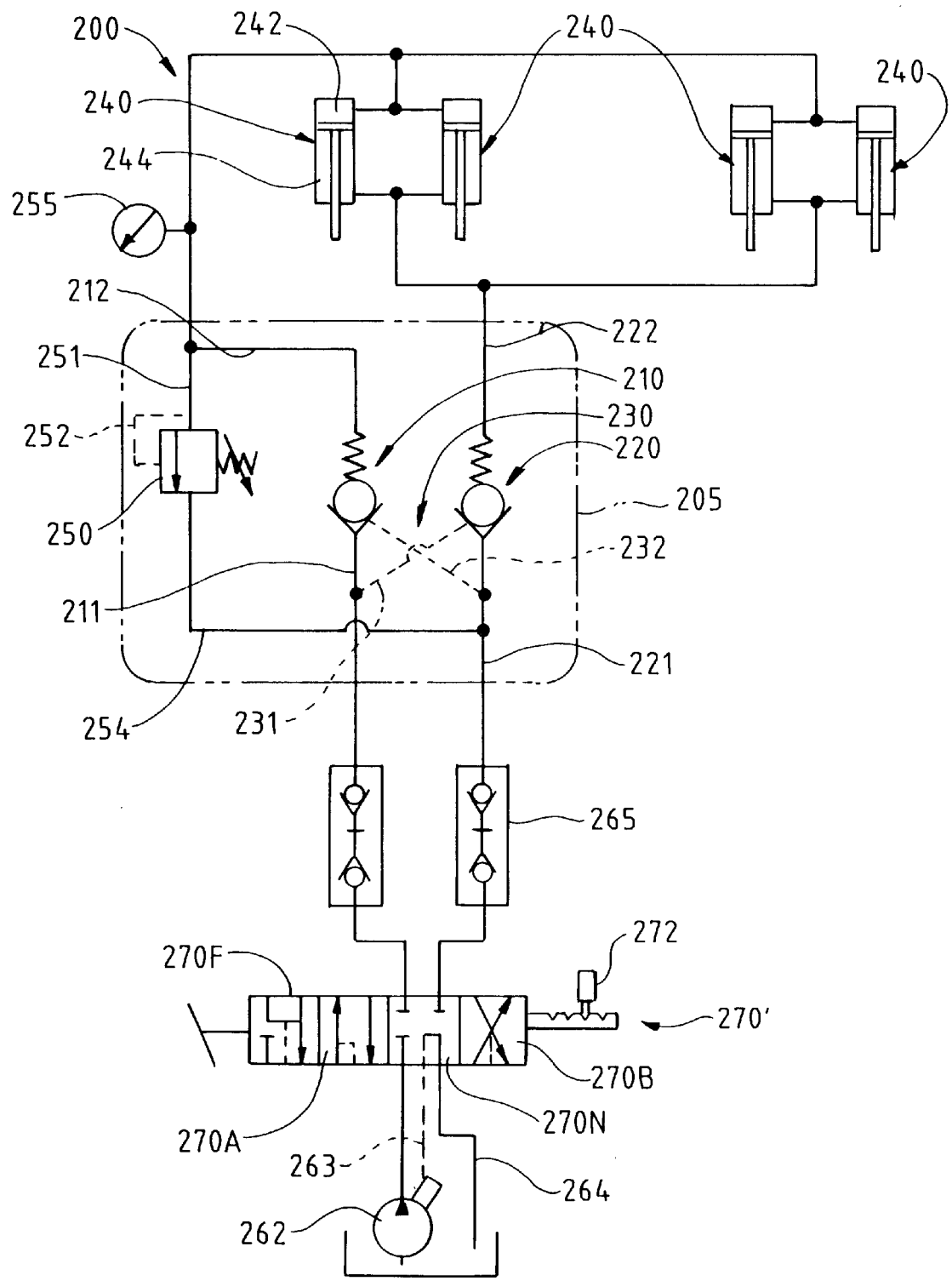
FIG. 6 is a schematic view of the representative embodiment of the hydraulic circuit of the agricultural implement shown in FIG. 1, as used in combination with a control valve having a closed-center operating position.

FIGS. 5 and 6 show a representative embodiment of the fluid circuit 200 of the present invention. Although the fluid circuit 200 may be a pneumatic system using air or a similar noncompressible gas, a hydraulic system using quality hydraulic fluid is preferred. More preferably, the hydraulic fluid is HY-TRAN PLUS brand fluid available from Viscosity Oil or the like. Except as otherwise noted, conventional plumbing components and fixtures may be used for construction and assembly of the fluid circuit 200. Reference hereinafter is therefore made, for purpose of illustration and not limitation, to a fluid circuit 200 using a hydraulic fluid.

The fluid circuit 200 embodied in FIGS. 5 and 6 includes a first check valve 210 having a first side 211 and a second side 212. As herein, the term "first side" is intended to describe the fluid port and conduit, if any, in communication with one side of the check valve, while the term "second side" is intended to describe the fluid port and conduit, if any, in communication with the other side of the check valve. The first side 211 of the first check valve 210 is connectable to a source of pressurized fluid flow, such as a pump 262 or similar device. For example, the first check valve 210 preferably is located on the agricultural implement 100 while the pump 262 is located on the vehicle. Conventional quick-connect couplings 265 having an automatic shut-off therefore are preferably provided, although a more permanent connection may be used if the pump 262 is located on the agricultural implement 100. Additionally, and as shown in FIGS. 5 and 6, the first side 211 of the first check valve 210 is further connectable to the pump 262 via a control valve 270 or 270'. Pressurized fluid flow therefore is selectively directed to the first side 211 of the first check valve 210 in response to the operating position of the control valve, as described further below.

With the pump 262 connected to the first side 211 of the first check valve 210, pressurized fluid flow may be directed across the first check valve 210 from the first side 211 to the second side 212. Conversely, the first check valve 210 is operatively connected to prevent reverse fluid flow from the second side 212 of the first check valve 210 to the first side 211 of the first check valve 210, unless otherwise opened.

At least one fluid cylinder 240, as described above, is provided in fluid communication with the second side 212 of the first check valve 210 such that the fluid cylinder 240 may be operated between a retracted position and an extended position. Such fluid cylinders 240 are conventional in construction and commercially available from Iowa Industrial Hydraulic of Pocahontas, Iowa, or any reputable cylinder manufacturer. For purpose of illustration, and as embodied in FIGS. 5 and 6, the second side 212 of the first check valve 210 preferably is in fluid communication with the head chamber 242 of the fluid cylinder 240. The head chamber 242 therefore can be pressurized, so as to extend the-fluid cylinder 240, when pressurized fluid flow is received by the first side 211 of the first check valve 210 and directed thereacross to the fluid cylinder 240. Preferably, a pressure sensor 255, such as a gauge or transducer, is located between the first check valve 210 and the fluid cylinder 240 to identify the fluid pressure thereacross.

As previously noted, the fluid cylinder 240 is operatively connected to control engagement of at least one ground engaging tool 130 with the ground by operation of the fluid cylinder 240. For example, it is possible to operatively attach one ground engaging tool 130 directly to a corresponding fluid cylinder 240, such that the tool 130 is moved to a lowered position in engagement with the ground when the fluid cylinder 240 is extended as accomplished by the fluid circuit 200 shown in FIGS. 5 and 6. Alternatively, the ground engaging tool 130 can be mounted on one end of a pivot arm having a central pivot point with the fluid cylinder 240 operatively connected to the opposite end of the pivot arm such that the tool 130 is moved to a lowered position when the fluid cylinder 240 is retracted. In this configuration, the second side 212 of the first check valve 210 would be in communication with the rod chamber 244 of the fluid cylinder 240.

The preferred embodiment of the invention, however, includes a substructure 120 connected to the frame 110 of the agricultural implement 100 for movement between a raised position and a lowered position. As such, and as shown for purpose of illustration and not limitation in FIG. 2, at least one fluid cylinder 240 is operatively connected between the frame 110 and the substructure 120. In this embodiment the second side 212 of the first check valve 210 is in fluid communication with the head chamber 242 of the fluid cylinder 240 as shown in FIGS. 5 and 6.

Further in accordance with the present invention, the fluid circuit 200 also includes a second check valve 220 having a first side 221 and a second side 222. The second side 222 of the second check valve 220 is provided in fluid communication with the fluid cylinder 240. Particularly, and as embodied herein, the second side 222 of the second check valve 220 is provided in fluid communication with the rod chamber 244 of the fluid cylinder 240. FIGS. 5 and 6 further show that the second check valve 220 is operatively connected to prevent fluid flow from the second side 222 of the second check valve 220 to the first side 221 of the second check valve 220. As such, the second check valve 220 must be opened to allow fluid to drain 264 from the rod chamber 244 of the fluid cylinder 240 as the head chamber 242 is pressurized.

A sensor assembly 230 is provided in accordance with the present invention to open the second check valve 220 when pressurized fluid flow is received by the first side 211 of the first check valve 210. Particularly, and as embodied herein, the sensor assembly 230 is connected to the first side 211 of the first check valve 210 so as to open the second check valve 220 in response to pressurized fluid flow being received by the first check valve 210 from the pump 262. With the second check valve 220 opened, fluid is allowed to flow from the second side 222 of the second check valve 220 to the first side 221 of the second check valve 220. As embodied in FIGS. 5 and 6, the head chamber 242 of the fluid cylinder 240 is thereby pressurized and the rod chamber 244 is opened to drain 264 so as to allow the fluid cylinder 240 to extend to its extended position.

Similarly, it is preferable for the sensor assembly 230 to be connected to the first side 221 of the second check valve 220 so as to open the first check valve 210 and allow reverse fluid flow from the second side 212 of the first check valve 210 to the first side 211 of the first check valve 210 when pressurized fluid flow is received by the first side 221 of the second check valve 220. In this manner, as described further below, the second check valve 220 may be connected to the source of pressurized fluid flow so as to pressurize the rod chamber 244 of the fluid cylinder 240. As the rod chamber 244 is pressurized, the first check valve 210 is opened so as to allow a reverse flow of fluid from the head chamber 242 of the fluid cylinder 240 to drain 264. The fluid cylinder 240 thereby retracts to its retracted position.

Any of a variety of sensor assemblies may be used, including conventional mechanical or electrical configurations. For example, a pressure transducer may be provided in connection with the first side 211 of the first check valve 210 so as to transmit an actuation signal to open the second check valve 220. Preferably, however, and as embodied herein, the sensor assembly 230 includes a first pilot conduit 231 operatively extending from the first side 211 of the first check valve 210 to open the second check valve 220. A second pilot conduit 232 operatively extending from the first side 221 of the second check valve 220 to open the first check valve 210 when pressurized fluid flow is received by the first side 211 of the first check valve 210 also may be provided when reverse fluid flow across the first check valve 210 is desired.

A pressure relief valve 250 connected between the first check valve 210 and the fluid cylinder 240 also is provided in accordance with the invention. Generally, the pressure relief valve 250 is biased to a closed position during normal operation, but configured to open when a preselected pressure proximate the inlet side 251 of the pressure relief valve 250 is exceeded. Such increased pressurization may be generated, for example, by excessive upward displacement of the substructure 120 due to ground surface undulations or similar obstacles acting against the tools 130. FIGS. 5 and 6 show a pilot sensor line 252 extending to a location proximate the inlet side 251 of the pressure relief valve 250, although an alternative actuation device for the pressure relief valve 250 may be used. The pressure relief valve 250 therefore may be used for fixed high pressure operation to prevent over pressurization of the system.

As shown in FIGS. 5 and 6, and in accordance with the present invention, the pressure relief valve 250 includes a relief port 254 in fluid communication with the first side 221 of the second check valve 220. When the pressure relief valve 250 is opened due to the preselected pressure being exceeded, the pressurized fluid between the first check valve 210 and the fluid cylinder 240 is directed from the pressure relief valve 250 to the first side 221 of the second check valve 220. In this manner, additional pressurized fluid flow from the pump 262 can be received by and directed across the first check valve 210 to continuously maintain a constant pressure in the head chamber 242 of the fluid cylinder 240, even when the pressure relief valve 250 is opened and pressurized fluid is being directed through the relief port 254 to the first side 221 of the second check valve 220.

Furthermore, and in accordance with a preferred aspect of the invention, the pressure relief valve 250 is adjustable to vary the preselected pressure at which the pressure relief valve 250 will open. As described further below with regard to the operation of the fluid circuit 200 and agricultural implement 100 using the same, the adjustable pressure relief valve 250 in combination with the arrangement of the check valves selectively enables either high pressure relief operation so as to prevent overpressurization of the system or continuous down pressure operation to maintain a constant down pressure engagement of the tools 130 with the ground during field operations.

Each valve component of the fluid circuit 200, as with the remaining elements, can be selected from a variety of commercially available products of suitable construction and capacity. For example, and with a 2500 p.s.i. system using HY-TRAN PLUS brand hydraulic fluid, a Model CV10-20-0-N-30 available from Hydraforce, Inc. may be used for each of the first and second check valves 210, 220, and a Model RV10-22B-0-NC-25/3.0 available from Hydraforce, Inc. may be used for the pressure relief valve 250. In a preferred embodiment, however, the two check valves, the sensor and the pressure relief valve are constructed, as a single integral unit as indicated by reference character 205. This can be accomplished, for example, by properly machining a suitable block using known techniques.

In the preferred embodiment of the fluid circuit, a plurality of fluid cylinders 240 are provided, each in fluid communication with the second side 212, 222 of both the first and the second check valves 210, 220. Furthermore, FIGS. 5 and 6 show that each fluid cylinder 240 is generally connected in parallel fluid communication with the other fluid cylinders 240 for substantially simultaneous operation. In this manner, a plurality of such fluid cylinders 240 may be used to move a single substructure 120, or each fluid cylinder 240 may be used to move a respective substructure 120 or tool 130. For example, and for purpose of illustration and not limitation, FIG. 2 shows the use of two fluid cylinders 240 for movement of the transverse tool bar 122 and, thus, operation of the tools 130 supported thereon. The two fluid cylinders 240 are similar in size and capacity, and symmetrically located for uniform and substantially simultaneous operation.

Alternatively, or additionally, FIG. 1 shows that at least one of the plurality of fluid cylinders 240 is operatively connected to exert a downwardly directed force on each wing frame 126 for engagement of the tools 130 with the ground. To accommodate uniform and substantially simultaneous operation, each fluid cylinder 240 must be properly dimension to account for and equalize the anticipated load thereon. That is, each fluid cylinder 240 must be sized proportional to the anticipated load—the greater the anticipated load, the greater the fluid cylinder 240 size.

As previously noted, a source of pressurized fluid flow typically is provided on the vehicle, such as a hydraulic pump 262 or the like. It is possible, however, to locate the pump 262 or similar source of pressurized fluid flow on the agricultural implement 100 itself if desired. This pump 262 therefore may be driven mechanically, such as by the power take-off shaft of the vehicle, or hydraulically via a secondary flow line. Regardless of whether mounted on the vehicle or on the agricultural implement 100, the capacity of the pump 262 will depend upon the requirements of the fluid circuit.

Additionally, a control valve is provided to select or manipulate the fluid flow path through the fluid circuit 200. In accordance with the present invention, a variety of control valve configurations may be used in combination with the fluid circuit to facilitate different operating capabilities. For example, either an open-center control valve 270 as shown in FIG. 5 or a closed-center control valve 270' as shown in FIG. 6 may be used in accordance with the fluid circuit of the present invention. Both the open-center control valve 270 and the closed-center control valve 270' each includes at least a first position 270A, a second position 270B, a neutral position 270N and a float position 270F, as described in detail below. Generally, the control valve 270 or 270' is selectively moveable between the first position 270A to extend the fluid cylinder 240 by pressurizing the head chamber 242, and a second position 270B to retract the fluid cylinder 240 by pressurizing the rod chamber 244. Hereinafter, the reference character 270 is used to identify the control valve generally, unless otherwise noted to distinguish certain aspects of the open-center control valve 270 and the closed-center control valve 270'.

With regard to the fluid circuit 200 embodied herein, the first position 270A of the control valve 270 is configured to connect the first side 211 of the first check valve 210 in fluid communication with the source of the pressurized fluid flow and the first side 221 of the second check valve 220 in fluid communication with drain 264 so as to pressurize the head chamber 242 without over pressurizing the rod chamber 244. This first position 270A therefore is used to lower the substructure 120, and thus the ground engaging tools 130, of the agricultural implement 100 shown in FIGS. 1–4. The second position 270B of the control valve 270 connects the first side 221 of the second check valve 220 in fluid communication with the source of the pressurized fluid flow and the first side 211 of the first check valve 210 in fluid communication with drain 264 so as to pressurize the rod chamber 244 without over pressurizing the head chamber 242. This second position 270B therefore is used to raise the substructure 120, and thus the ground engaging tools 130, of the agricultural implement 100 shown in FIGS. 1–4.

Additionally, and as noted above, the control valve 270 includes an intermediate or neutral position 270N wherein the chambers of the fluid cylinder 240 are isolated from further pressurization as well as from drain 264 so as, effectively, to secure the pressure therein. This neutral position 270N may be either an open-center position or a closed-center position, as is commonly known. The open-center position, as shown in FIG. 5 with regard to the open-center control valve 270, is configured to isolate the first side 211, 221 of both check valves 210, 220, and to return the continuous low pressurized fluid flow from the pump 262 directly to drain 264. This open-center position generally is used in combination with a pump 262 or similar source of pressurized fluid flow having a fixed operating capacity.

The closed-center position, as shown in FIG. 6 with regard to the closed-center control valve 270', likewise is configured to isolate the first side 211, 221 of both check valves 210, 220. Rather than return pressurized fluid flow to drain 264, however, the closed-center position is configured to secure the pressurized fluid flow from the pump 262 as well. This closed-center position is used in combination with a pump 262 that is adjustable between a low-flow condition and a high-flow condition. Preferably, the pump 262 is switched automatically between the low-flow condition and the high-flow condition when a predetermined pressure at the control valve 270' is reached. The pump 262 therefore will switch to low-flow condition when demand for pressurized fluid is low to enable more efficient operation, and return to its high-flow condition upon demand. Alternatively, the change in operating condition can be performed manually if desired.

The control valve 270 also includes a float position 270F to isolate both chambers of the fluid cylinder 240 from further pressurization, but still allow pressurized fluid from either chamber to drain 264 when necessary such as when the pressure relief valve 250 is opened due to a pressure increase in the head chamber 242. The float position 270F of the control valve 270 shown in FIGS. 5 and 6 therefore connects the first side 211 of the first check valve 210 and the first side 221 of the second check valve 220 in fluid communication with drain 264. If the control valve 270 has an open-center neutral position 270N, as shown in FIG. 5 with regard to the open-center control valve 270, the float position 270F of the control valve 270 will be configured to return the continuous low pressurized fluid flow from the pump 262 directly to tank. If a closed-center control valve 270' is used, then the float position 270F will be configured to secure the pressurized fluid flow from the pump 262 and include a signal line 263 to allow pressure to bleed off and return the pump 262 to standby pressure and flow conditions as shown in FIG. 6.

The open-center control valve 270 and the closed-center control valve 270' are well known and commonly located proximate the operator cab of a tractor or similar agricultural vehicle. The control valve 270 is manually moved by the operator between its operating positions and then held in its selected position by a conventional detent mechanism 272. Alternatively, it is possible for the control valve 270 to be located in a different location, such as on the agricultural implement 100, and operated remotely from the operator cab of the vehicle.

Operation of the fluid circuit 200, and thus the agricultural implement 100, will depend upon the type of control valve 270 provided and the arrangement of the fluid cylinders 240 relative to the substructure 120. For purpose of explanation and not limitation, reference is made to the fluid cylinder 240 and substructure 120 arrangement of FIGS. 1–4. That is, explanation is provided of an agricultural implement 100 having a tool bar 122 moveable to a lowered position by extension of two fluid cylinders 240 connected in parallel, and further having two opposite wing frames 126, each lowered by a respective fluid cylinder 240 likewise connected in parallel. The fluid circuit 200 may be connected to a tractor or similar vehicle having an open-center control valve 270 as shown in FIG. 5 for high pressure relief operation, or a closed-center control valve 270' as shown in FIG. 6 for either high pressure relief operation or continuous down pressure operation.

With reference to the embodiment of FIG. 5, the fluid cylinders 240 are extended by moving the open-center control valve 270 to the first position 270A so as to connect the first side 211 of the first check valve 210 in fluid communication with the pump 262 and the first side 221 of the second check valve 220 in fluid communication to drain 264. Once the desired pressure within the fluid cylinder 240 is reached, as indicated by the pressure sensor, the open-center control valve 270 is moved to its float position 270F. The pressure relief valve 250 is adjusted to a high preselected release pressure, e.g., 2500 p.s.i., and the first side 211, 221 of the first and second check valves 210, 220 are connected to drain 264. When an obstacle is traversed during field operations, such that the preselected pressure is exceeded, the pressure relief valve 250 will open and pressurized fluid therefrom will be directed to the first side 221 of the second check valve 220 and, thus, to float position 270F. Pressure within the head chamber 242 of the fluid cylinder 240 thereafter is increased by manually returning the open-center control valve 270 to the first position 270A until the desired pressure is again reached. When field operations are completed, the fluid cylinder 240 is retracted by selectively moving the control valve 270 to the second position 270B so as to connect the first side 221 of the second check valve 220 in fluid communication with the pump 262 and the first side 211 of the first check valve 210 in fluid communication with drain 264.

When a closed-center control valve 270' is provided, as shown in FIG. 6, the fluid circuit 200 can be operated either for high pressure relief or for continuous down pressure control. If high pressure relief is desired, the closed-center control valve 270' is operated in the same manner as described with regard to the open-center control valve 270 described above with regard to FIG. 5. When continuous down pressure control is desired, the closed-center control valve 270' is first moved to the first position 270A to pressurize the head chamber 242 and extend the fluid cylinder 240. The pressure relief valve 250 is adjusted to the preselected pressure that is desired for continuous down pressure operation, e.g., 1000 p.s.i., and the closed-center control valve 270' is maintained in its first position 270A by the detent mechanism. The pump 262 therefore is adjusted to its low-flow condition, either automatically or manually, by the signal directed to the first check valve 210 via pump signal line 263. When an obstacle is traversed during field operations, such that the preselected pressure is exceeded, the pressure relief valve 250 will open and pressurized fluid therefrom will be directed to the first side 221 of the second check valve 220 and, thus, to drain 264. The pump 262 will then switch to its operating mode, either automatically or manually to accommodate the demand for additional pressurized fluid until the desired down pressure is again reached. When field operations are completed, the fluid cylinder 240 is retracted by selectively moving the control valve 270' to the second position 270B so as to connect the first side 221 of the second check valve 220 in fluid communication with the pump 262 and the first side 211 of the first check valve 210 in fluid communication with drain 264.

In view of the description above, it is evident that the present invention provides a fluid circuit for an agricultural implement having improved operating capabilities. Although reference has been made to particular materials of construction, configurations and operating parameters for the purpose of explanation, it is understood that alternatives are available. It also will be apparent to those skilled in the art that various modifications and variations can be made in the design and construction of the fluid circuit and agricultural implement without departing from the scope or spirit of the invention.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A fluid circuit to control an agricultural ground engaging tool, the fluid circuit comprising:
    a first check valve having a first side and a second side, the first side of the first check valve connectable to a source of pressurized fluid flow, the first check valve operatively connected to prevent reverse fluid flow from the second side of the first check valve to the first side of the first check valve;
    at least one fluid cylinder in fluid communication with the second side of the first check valve to operate the fluid cylinder between a retracted position and an extended position, the fluid cylinder operatively connected to control engagement of the ground engaging tool with the ground by operation of the fluid cylinder;
    a second check valve having a first side and a second side, the second side of the second check valve in fluid communication with the fluid cylinder, the second check valve operatively connected to prevent fluid flow from the second side of the second check valve to the first side of the second check valve;
    a sensor assembly connected to the first side of the first check valve to open the second check valve and allow fluid flow from the second side of the second check valve to the first side of the second check valve when pressurized fluid flow is received by the first side of the first check valve and wherein the sensor assembly further is connected to the first side of the second check valve to open the first check valve and allow reverse fluid flow from the second side of the first check valve to the first side of the first check valve when pressurized fluid flow is received by the first side of the second check valve; and
    a pressure relief valve connected between the first check valve and the fluid cylinder, the pressure relief valve having a relief port in fluid communication with the first side of the second check valve to direct pressurized fluid thereto when the pressurized fluid between the second side of the first check valve and the fluid cylinder exceeds a preselected pressure.

2. The fluid circuit of claim 1, wherein the pressure relief valve is adjustable to vary the preselected pressure at which the pressurized fluid is to be directed from the pressure relief valve to the first side of the second check valve.

3. The fluid circuit of claim 1, wherein the fluid cylinder has a head chamber and a rod chamber, the fluid cylinder being extended to the extended position by pressurization of the head chamber and retracted to the retracted position by pressurization of the rod chamber, and further wherein the head chamber is in fluid communication with the second side of the first check valve and the rod chamber is in fluid communication with the second side of the second check valve.

4. The fluid circuit of claim 1, wherein the ground engaging tool is supported on a substructure moveable between a raised position and a lowered position, the fluid cylinder being connected to move the substructure between the raised position and the lowered position by operation of the fluid cylinder.

5. The fluid circuit of claim 1, wherein a plurality of fluid cylinders are provided, each fluid cylinder in fluid communication with the second side of the first check valve and with the second side of the second check valve.

6. The fluid circuit of claim 5, wherein each fluid cylinder is connected in parallel fluid communication with the other fluid cylinders for substantially simultaneous operation.

7. The fluid conduit of claim 1, wherein the sensor assembly includes a first pilot conduit operatively extending from the first side of the first check valve to open the second check valve when pressurized fluid flow is received by the first side of the first check valve, and a second pilot conduit operatively extending from the first side of the second check valve to open the first check valve when pressurized fluid flow is received by the first side of the second check valve.

8. The fluid circuit of claim 1 further comprising a control valve selectively moveable between at least a first position to connect the first side of the first check valve in fluid communication with the source of the pressurized fluid flow and the first side of the second check valve in fluid communication with a drain, a second position to connect the first side of the second check valve in fluid communication with the source of the pressurized fluid flow and the first side of the first check valve in fluid communication with the drain, and a float position to connect the first side of the first check valve and the first side of the second check valve in fluid communication with the drain.

9. The fluid circuit of claim 8, wherein the source of pressurized fluid flow is adjustable between a low-flow condition and a high-flow condition.

10. The fluid conduit of claim 1, wherein the first check valve, the second check valve and the pressure relief valve are constructed as a single integral unit.

11. An agricultural implement to be conveyed by a self propelled vehicle, the agricultural implement comprising:
    a structural frame;
    a substructure connected to the frame for movement between a raised position and a lowered position, the substructure having at least one ground engaging tool supported thereon so as to engage the ground when the substructure is moved to the lowered position; and
    a fluid circuit to control engagement of the ground engagement tool with the ground, the fluid circuit including
        a first check valve having a first side and a second side, the first side of the first check valve connectable to a source of pressurized fluid flow, the first check valve operatively connected to prevent reverse fluid flow from the second side of the first check valve to the first side of the first check valve,
        at least one fluid cylinder in fluid communication with the second side of the first check valve to operate the fluid cylinder between a retracted position and an extended position, the fluid cylinder connected to move the substructure between the raised position and the lowered position by operation of the fluid cylinder, a second check valve having a first side and a second side, the second side of the second check valve in fluid communication with the fluid cylinder, the second check valve operatively connected to prevent fluid flow from the second side of the second check valve to the first side of the second check valve, a sensor assembly connected to the first side of the first check valve to open the second check valve and allow fluid flow from the second side of the second check valve to the first side of the second check valve when pressurized fluid flow is received by the first side of the first check valve and wherein the sensor assembly further is connected to the first side of the second check valve to open the first check valve and allow reverse fluid flow from the second side of the first check valve to the first side of the first check valve when pressurized fluid flow is received by the first side of the second check valve; and a pressure relief valve connected between the first check valve and the fluid cylinder, the pressure relief valve having a relief port in fluid communication with the first side of the second check valve to direct pressurized fluid thereto when the pressurized fluid between the second side of the first check valve and the fluid cylinder exceeds a preselected pressure.

12. The agricultural implement of claim 11, wherein the pressure relief valve is adjustable to vary the preselected pressure at which the pressurized fluid is to be directed from the pressure relief valve to the first side of the second check valve.

13. The agricultural implement of claim 11, wherein the fluid cylinder has a head chamber and a rod chamber, the fluid cylinder being extended to the extended position by pressurization of the head chamber and retracted to the retracted position by pressurization of the rod chamber, and further wherein the head chamber is in communication with the second side of the first check valve and the rod chamber is in communication with the second side of the second check valve.

14. The agricultural implement of claim 11, wherein a plurality of substructures are connected for movement between a raised position and a lowered position, each substructure having at least one fluid cylinder connected thereto to move the substructure between the raised position and the lowered position, each fluid cylinder in communication with the second side of the first check valve and with the second side of the second check valve.

15. The agricultural implement of claim 14, wherein each fluid cylinder is connected in parallel communication with the other fluid cylinders for substantially simultaneous operation.

16. The agricultural implement of claim 11, wherein the sensor assembly includes a first pilot conduit operatively extending from the first side of the first check valve to open the second check valve when pressurized fluid flow is received by the first side of the first check valve, and a second pilot conduit operatively extending from the first side of the second check valve to open the first check valve when pressurized fluid flow is received by the first side of the second check valve.

17. The agricultural implement of claim 11, wherein the first check valve, the second check valve and the pressure relief valve are constructed as a single integral unit.

18. The agricultural implement of claim 11, wherein the substructure is a transverse tool bar connected to the frame by at least one link member pivotally extending therebetween.

19. The agricultural implement of claim 11, wherein the substructure is a wing frame connected for pivotal movement about a longitudinal axis.

* * * * *